(12) United States Patent
Chen et al.

(10) Patent No.: US 12,349,811 B2
(45) Date of Patent: Jul. 8, 2025

(54) OUTDOOR FOLDABLE FURNITURE WITH A LAMPLIGHT DECORATION STRUCTURE

(71) Applicant: Yotrio Group Co., Ltd., Linhai (CN)

(72) Inventors: Tao Chen, Linhai (CN); Qing Zhang, Linhai (CN); Jianqiang Xie, Linhai (CN)

(73) Assignee: Yotrio Group Co., Ltd., Linhai (CN)

(*) Notice: Subject to any disclaimer, the term of this patent is extended or adjusted under 35 U.S.C. 154(b) by 219 days.

(21) Appl. No.: 18/220,254

(22) Filed: Jul. 10, 2023

(65) Prior Publication Data

US 2024/0268562 A1    Aug. 15, 2024

(30) Foreign Application Priority Data

Feb. 9, 2023  (CN) .......................... 202320167239.2

(51) Int. Cl.
| | | |
|---|---|---|
| A47C 1/14 | (2006.01) | |
| A47C 4/00 | (2006.01) | |
| A47C 7/72 | (2006.01) | |
| F16B 7/04 | (2006.01) | |
| F21V 23/00 | (2015.01) | |
| F21V 33/00 | (2006.01) | |

(52) U.S. Cl.
CPC ............ *A47C 7/725* (2013.01); *A47C 1/14* (2013.01); *A47C 4/00* (2013.01); *F21V 23/002* (2013.01); *F21V 33/0012* (2013.01); *F16B 7/0446* (2013.01); *Y10T 403/32131* (2015.01); *Y10T 403/32557* (2015.01)

(58) Field of Classification Search
CPC .. A47C 7/725; A47C 1/14; A47C 4/00; F16B 7/0446; Y10T 403/32131; Y10T 403/32557

USPC .......................... 297/24, 27, 28; 403/83, 119
See application file for complete search history.

(56) References Cited

U.S. PATENT DOCUMENTS

| | | | | |
|---|---|---|---|---|
| 4,125,249 A | * | 11/1978 | Zen ...................... | E04F 11/1834 403/189 |
| 4,674,793 A | * | 6/1987 | Kettler ................. | A47C 1/0265 297/28 X |
| 4,792,181 A | * | 12/1988 | Guichon ............... | A47C 1/035 297/28 X |
| 5,855,409 A | * | 1/1999 | Tseng ..................... | A47C 4/14 297/27 |

(Continued)

*Primary Examiner* — Rodney B White
(74) *Attorney, Agent, or Firm* — Jinaming Cai (James); SAC Attorneys LLP

(57) ABSTRACT

An article of outdoor foldable furniture with a lamplight decoration structure includes a frame body and a foldable component for connecting the frame body. The frame body is provided with at least one light bar groove. The foldable component includes a first connecting part, a folding part, and a second connecting part. The first and second connecting parts are closed and extended through the folding part. The first connecting part and/or the second connecting part are provided with a luminous body mounting groove. The luminous body mounting groove is correspondingly disposed in the light bar groove of the frame body. A lampshade, provided with a light guide bar, is mounted in the light bar groove of the frame body. A light-emitting unit corresponding to the light guide bar is mounted in the luminous body mounting groove. A controller is conductively connected to the light-emitting unit through flexible wires.

10 Claims, 4 Drawing Sheets

(56) References Cited

U.S. PATENT DOCUMENTS

| | | | | |
|---|---|---|---|---|
| 6,161,898 | A * | 12/2000 | Brevi | A47D 1/004 |
| | | | | 297/16.1 X |
| 6,412,742 | B1 * | 7/2002 | Yu | G10G 5/00 |
| | | | | 403/119 |
| 6,502,899 | B2 * | 1/2003 | Tseng | A47C 7/54 |
| | | | | 297/28 X |
| 7,334,836 | B2 * | 2/2008 | Chen | A47D 1/023 |
| | | | | 297/16.2 |
| 2005/0248186 | A1 * | 11/2005 | Wang | A47D 1/0081 |
| | | | | 297/148 |
| 2011/0262215 | A1 * | 10/2011 | Thacker | E04G 7/307 |
| | | | | 403/81 |
| 2024/0341476 | A1 * | 10/2024 | Ressler | A47C 7/624 |

* cited by examiner

OUTDOOR FOLDABLE FURNITURE WITH A LAMPLIGHT DECORATION STRUCTURE

CROSS-REFERENCE TO RELATED APPLICATIONS

This application claims priority to and the benefit of the patent application titled "An outdoor foldable furniture with a lamplight decoration structure", application number 2023201672392, filed in the China National Intellectual Property Administration on Feb. 9, 2023. The specification of the above-referenced patent application is incorporated herein by reference in its entirety.

FIELD OF THE INVENTION

The present invention, in general, relates to outdoor furniture, and in particular, relates to an article of outdoor foldable furniture with a lamplight decoration structure.

BACKGROUND

Outdoor furniture is widely and increasingly being used in daily life. Outdoor furniture is often placed in places such as outdoor plazas, gateways of shopping malls and shops, outdoor balconies, etc., for people to rest and enjoy leisure time. With the popularity of outdoor furniture, there is a need for incorporating more diversified functions therein.

In outdoor furniture, for example, in outdoor chairs and tables, adding lamplights such as atmosphere light bars, can improve use effects and increase an aesthetic appearance of the outdoor furniture. However, light bar structures equipped in conventional outdoor furniture are usually only suitable for fixed tables and fixed chairs and cannot couple and operate with foldable components in outdoor foldable furniture.

SUMMARY OF THE INVENTION

To address the above-recited problems, the present invention provides an article of outdoor foldable furniture with a lamplight decoration structure, which is suitable for light installation in foldable furniture and improves an aesthetic appearance and service functions of the outdoor foldable furniture.

The article of outdoor foldable furniture with the lamplight decoration structure disclosed herein comprises a frame body and a foldable component for connecting the frame body. The frame body is provided with a light bar groove. The foldable component comprises a first connecting part, a folding part, and a second connecting part. The first connecting part and the second connecting part are configured to be closed and extended through the folding part. The first connecting part and the second connecting part are both configured to connect to the frame body. The first connecting part and/or the second connecting part are provided with a luminous body mounting groove. The luminous body mounting groove is correspondingly disposed in the light bar groove of the frame body.

A lampshade is mounted in the light bar groove of the frame body. A light guide bar is provided in the lampshade. A light-emitting unit is mounted in the luminous body mounting groove. An end face of the light guide bar corresponds to the light-emitting unit.

In an embodiment, the number of light bar grooves in the frame body is at least one. At least one light bar groove is provided on a side edge or a side wall surface of the frame body.

The article of outdoor foldable furniture with the lamplight decoration structure further comprises a controller conductively connected to the light-emitting unit through flexible wires.

The controller is provided with a take-up device. The flexible wires are configured to be released and taken up through the take-up device.

In an embodiment, the article of outdoor foldable furniture is an outdoor foldable chair, where the frame body is a chair leg pipe. An end face of the chair leg pipe is provided with an embedded cavity and at least one light bar groove. The first connecting part and the second connecting part of the foldable component are installed within corresponding embedded cavities of the chair leg pipe.

In an embodiment, the folding part of the foldable component comprises a first folding part and a second folding part. The first folding part is installed in the first connecting part of the foldable component. The second folding part is installed in the second connecting part of the foldable component. The first folding part and the second folding part are butted and connected to each other. A hinge assembly is disposed between the first folding part and the second folding part.

In an embodiment, the hinge assembly comprises a first end cover piece and a second end cover piece. The first end cover piece comprises a first end cover and a first shaft disposed on the first end cover. The second end cover piece comprises a second end cover and a second shaft disposed on the second end cover. The first shaft and the second shaft are butted and connected to each other.

In an embodiment, the first folding part or the second folding part is provided with an adjusting base. An upper part of the adjusting base is configured to connect to an armrest piece of the article of outdoor foldable furniture. A bottom surface of the armrest piece is provided with multiple adjusting limit grooves.

In another embodiment, the article of outdoor foldable furniture is an outdoor foldable chair and a table, where the frame body is a table leg pipe and/or a table frame pipe. An end face of the table leg pipe and/or the table frame pipe is provided with an embedded cavity and at least one light bar groove. The first connecting part and the second connecting part of the foldable component are installed within corresponding embedded cavities of the table leg pipe and/or the table frame pipe.

Through an optimized design, the present invention is suitable for matched light installation in foldable furniture, and improves the aesthetic appearance and use effects of outdoor furniture. Moreover, the structure of the folding part of the present invention is optimized. The matched independent luminous body mounting groove(s) in the foldable component facilitates the installation of the light-emitting unit and allows connection of different frame bodies thereto. Furthermore, the present invention provides flexible wiring and improves installation convenience. Furthermore, the take-up device that is connected to the controller facilitates release and taking up of the flexible wires, to reduce interference by the foldable structures of the present invention to the wires.

To understand the characteristics of the present invention, refer to the drawings and the following detailed description of the invention.

DETAILED DESCRIPTION OF THE INVENTION

Figure 1:
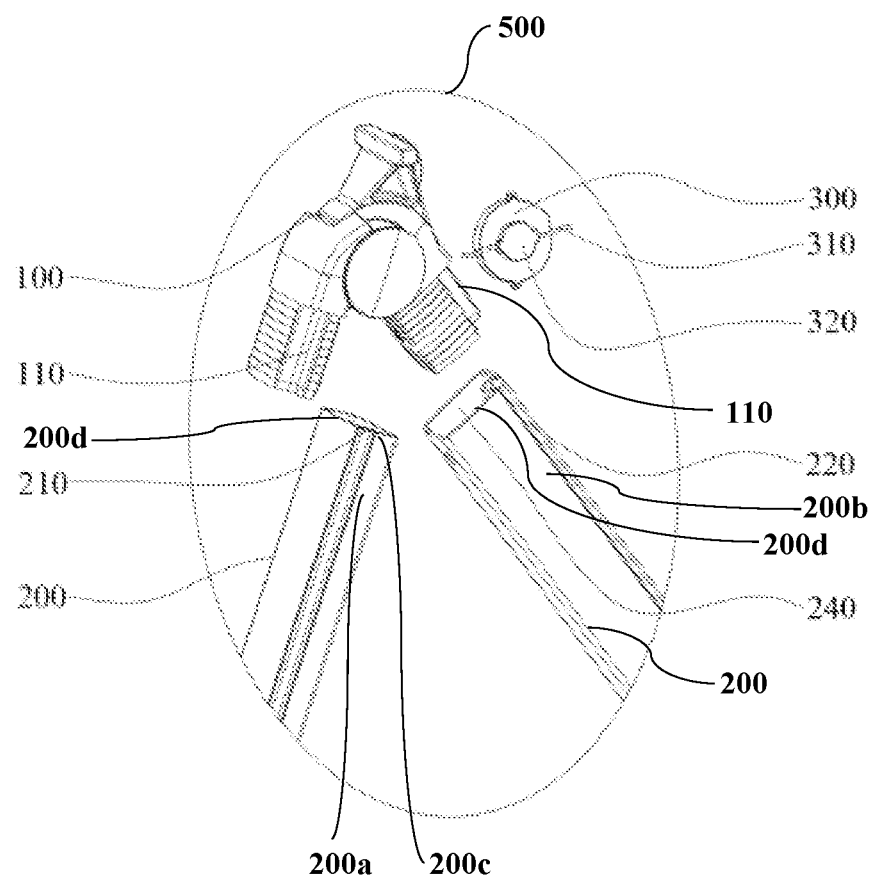
FIG. 1 is a disassembled structural diagram of a lamplight decoration structure configured in an article of outdoor foldable furniture.

To make the technical means, creative features, purposes achieved, and effects of the present invention easy to understand, the following is a further elaboration of the present invention combined with specific illustrations.

Disclosed herein is an embodiment of an article of outdoor foldable furniture with a lamplight decoration structure 500 comprising a frame body 200 and a foldable component 100 for connecting the frame body 200 as shown in FIG. 1 to FIG. 6. The foldable component 100 comprises a first connecting part 120, a folding part 140, and a second connecting part 130. The first connecting part 120 and the second connecting part 130 are configured to be closed and extended through the folding part 140. The first connecting part 120 and the second connecting part 130 are both configured to connect to the frame body 200. The first connecting part 120 and the second connecting part 130 are butted and connected to the frame body 200. In an embodiment, a clamping mounting mode is adopted to fix and tighten the first connecting part 120 and the second connecting part 130 to each other and to the frame body 200 using fasteners.

Figure 2:
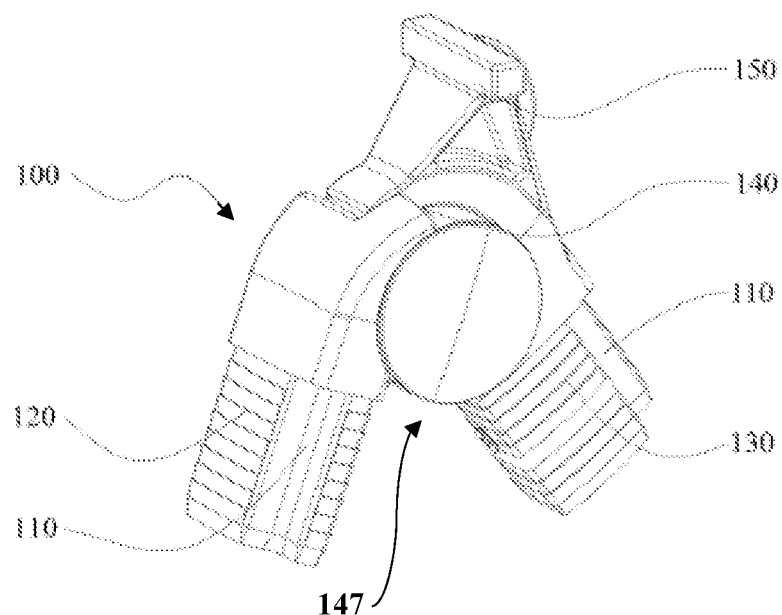
FIG. 2 is a structural diagram of a foldable component of the present invention.

In an embodiment, the first connecting part 120 or the second connecting part 130 of the foldable component 100 is provided with a luminous body mounting groove 110, which is disposed on one frame body 200. In another embodiment as shown in FIG. 2, each of the first connecting part 120 and the second connecting part 130 is provided with a luminous body mounting groove 110. The luminous body mounting grooves 110 are disposed on two sides 200a and 200b of the frame body 200.

The frame body 200 is provided with a light bar groove 210. The luminous body mounting groove 110 is correspondingly disposed in the light bar groove 210 of the frame body 200. In an embodiment, the number of light bar grooves 210 in the frame body 200 is at least one. In an embodiment, at least one light bar groove 210 is provided on a side edge or a side wall surface 200c of the frame body 200 as shown in FIG. 1.

In an embodiment as shown in FIG. 1, one light bar groove 210 is arranged on a bevel edge of the frame body 200 to form an improved visual effect and increase the effects of light in the present invention.

Figure 5:
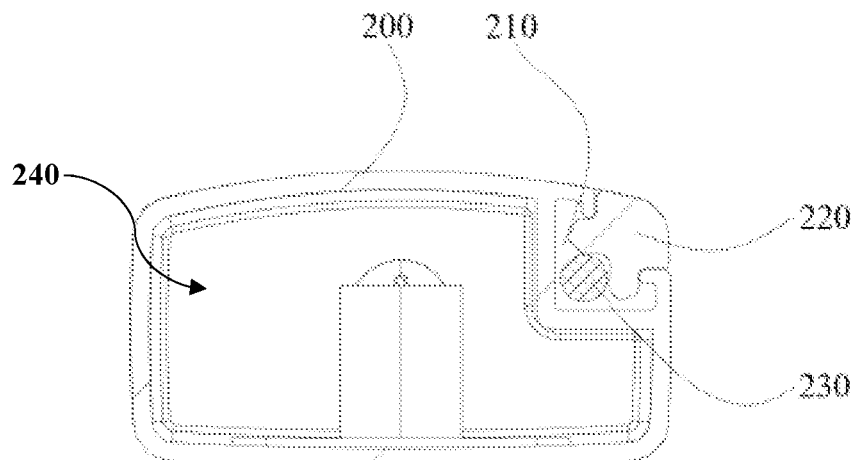
FIG. 5 is a sectional diagram of a frame body of the article of outdoor foldable furniture.

In an embodiment, a lampshade 220 is mounted in the light bar groove 210 of the frame body 200 as shown in FIG. 1 and FIG. 5. In an embodiment, the lampshade 220 is a flexible translucent lampshade. A light guide bar 230 is provided in the lampshade 220. In an embodiment, the light guide bar 230 is a cylindrical light guide bar. A light-emitting unit is mounted in the luminous body mounting groove 110. An end face of the light guide bar 230 matches with and corresponds to the light-emitting unit. The matching clearance between the light guide bar 230 and the light-emitting unit adopts a surface attachment mode. In an embodiment, there is a clearance of, for example, less than about 5 millimeters (mm), between the light guide bar 230 and the light-emitting unit, which is conducive to light transmissions. In an embodiment, the light-emitting unit is a light-emitting diode (LED) lamp bead. The LED lamp bead abuts against the light guide bar 230 to transmit light. To achieve a better light transmission effect, the scattered light of the LED lamp bead is corrected to form parallel lights, which is conducive to transmitting light into the light guide bar 230 and completing the light effects.

Figure 3:
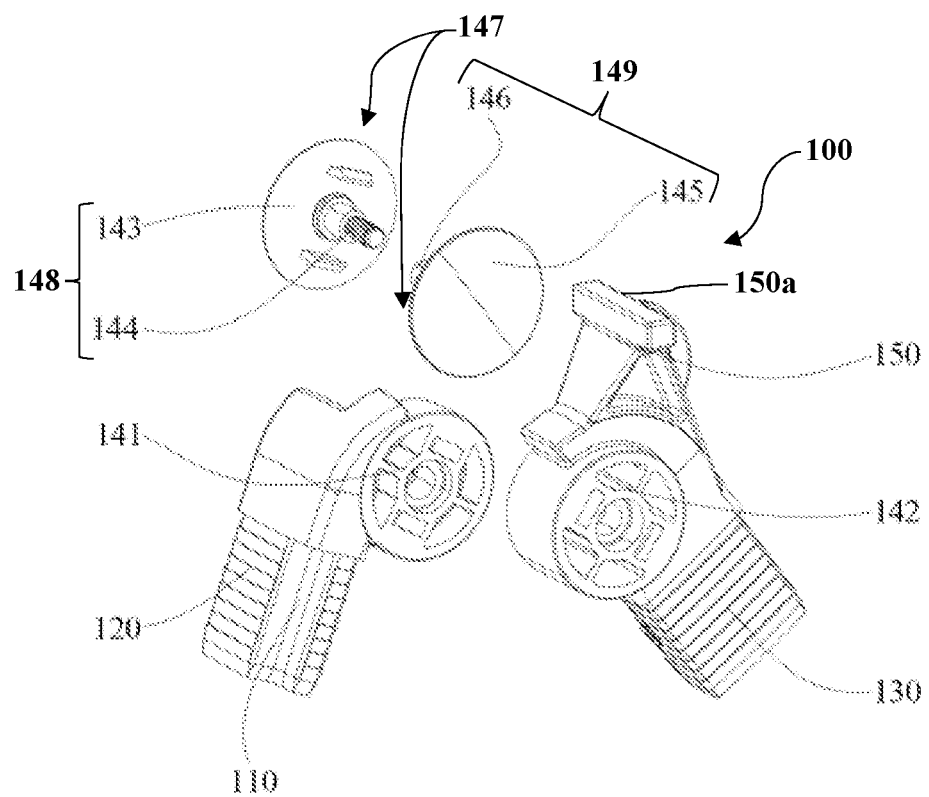
FIG. 3 is a disassembled structural diagram of the foldable component of the present invention.

In an embodiment as shown in FIG. 1, the lamplight decoration structure 500 further comprises a controller 300 that is conductively connected to the light-emitting unit through flexible wires 310. In an embodiment, the controller 300 is a light-emitting diode (LED) lamp bead controller. The controller 300 is mounted on the foldable component 100 or on an armrest, or on other parts of an article of outdoor foldable furniture or the lamplight decoration structure 500 as required. The conductive connection between the controller 300 and the light-emitting unit is achieved by the flexible wires 310 to execute functions, for example, on/off control, stepless color adjustment and control, dimming control, flashing mode control, etc., of the light-emitting unit. In an embodiment, the controller 300 is provided with a take-up device 320 as shown in FIG. 1, for releasing and taking up the flexible wires 310. The take-up device 320 is arranged such that the flexible wires 310 can be released or taken up by using an automatic taking up function of the take-up device 320, thereby allowing the foldable component 100 to be folded or opened along with the frame body 200. Moreover, in the present invention, the structure of the folding part 140 of the foldable component 100 is optimized as shown in FIG. 3. Furthermore, the matched independent luminous body mounting groove 110 in the foldable component 100 facilitates the installation of the light-emitting unit and allows connection and matching of different frame bodies 200 thereto. Furthermore, the lamplight decoration structure 500 provides flexible wiring and improves installation convenience.

Figure 6:
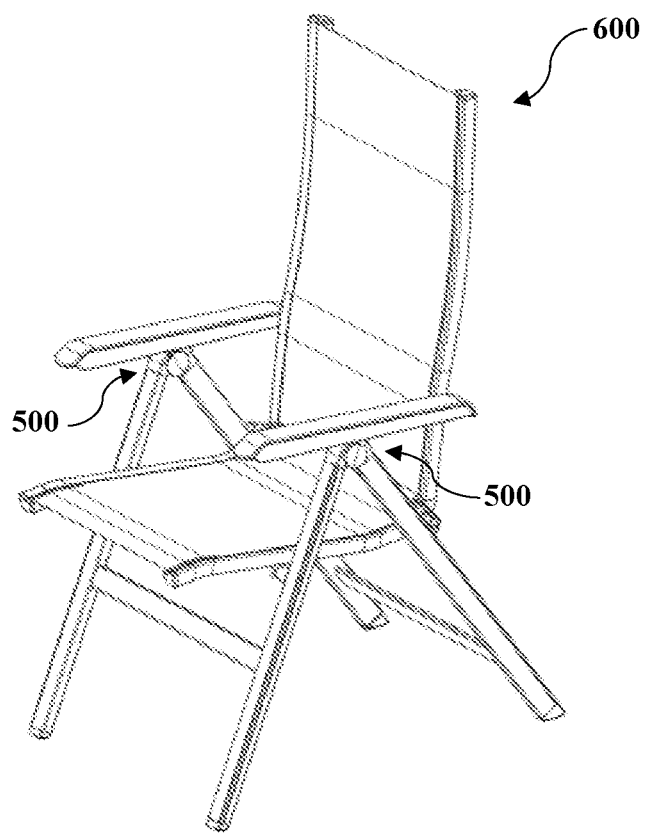
FIG. 6 is a structural diagram of a foldable chair with the lamplight decoration structure.

In an embodiment, the article of outdoor foldable furniture is an outdoor foldable chair 600 as shown in FIG. 6, where the frame body 200 is a chair leg pipe. An end face 200d of the chair leg pipe is provided with an embedded cavity 240 and a light bar groove 210 as shown in FIG. 1 and FIG. 5. The first connecting part 120 and the second connecting part 130 of the foldable component 100 are mounted within the corresponding embedded cavities 240 of the chair leg pipe. The folding part 140 of the foldable component 100 comprises a first folding part 141 and a second folding part 142 as shown in FIG. 3. The first folding part 141 is installed in the first connecting part 120 of the foldable component 100, and the second folding part 142 is installed in the second connecting part 130 of the foldable component 100. The first folding part 141 and the second folding part 142 are butted and connected to each other. A hinge assembly 147 is disposed between the first folding part 141 and the second folding part 142 as shown in FIG. 2. By adopting the above structure, the folding part 140 is of a split structure in design, where, in an embodiment, the first folding part 141 and the first connecting part 120 are an integral structure, and the second folding part 142 and the second connecting part 130 are an integral structure as shown in FIG. 3. The luminous body mounting groove 110 in each of the first connecting part 120 and the second connecting part 130 is grooved according to the position of the light bar groove 210 in the chair leg pipe as shown in FIG. 1, so that the light bar groove 210 and the luminous body mounting groove 110 form a communicating cavity, facilitating the matched installation of the light guide bar 230 and the light-emitting unit as shown in FIG. 5.

In an embodiment, the hinge assembly 147 comprises a first end cover piece 148 and a second end cover piece 149 as shown in FIG. 3. The first end cover piece 148 comprises a first end cover 143 and a first shaft 144 disposed on the first end cover 143. The second end cover piece 149 comprises a second end cover 145 and a second shaft 146 disposed on the second end cover 145. The first shaft 144 and the second shaft 146 are butted and connected to each other. The hinge assembly 147 forms a hinged movable structure at the folding part 140 of the foldable component 100 for extending and folding the first connecting part 120 and the second connecting part 130 of the foldable component 100.

Figure 4:
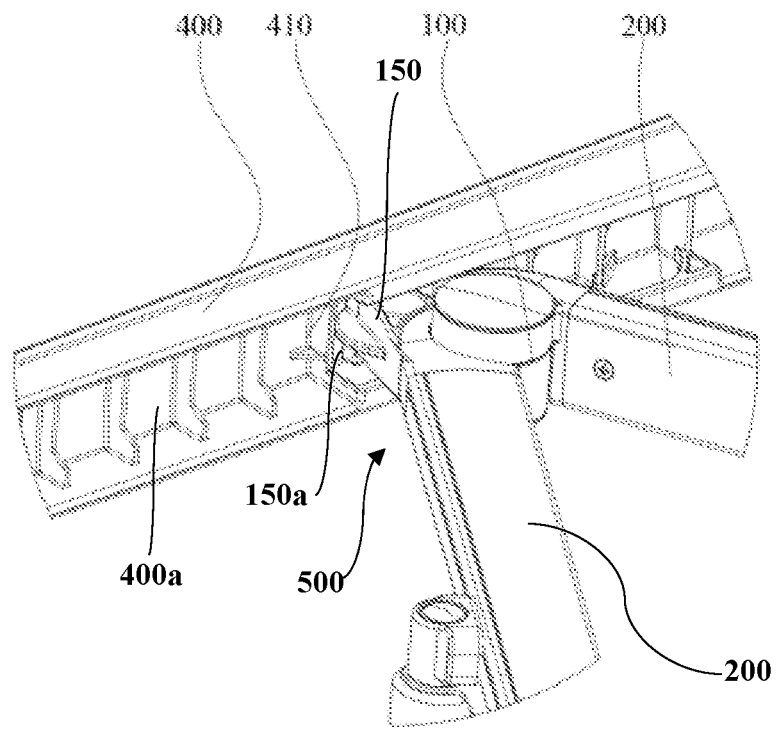
FIG. 4 is a structural diagram of the foldable component connected to a bottom surface of an armrest piece of an article of outdoor foldable furniture.

In an embodiment, the first folding part 141 or the second folding part 142 is provided with an adjusting base 150 as shown in FIGS. 2-3. An upper part 150a of the adjusting base 150 is configured to connect to an armrest piece 400 of an article of outdoor foldable furniture as shown in FIG. 4. A bottom surface 400a of the armrest piece 400 is provided with multiple adjusting limit grooves 410 as shown in FIG. 4. The adjusting limit grooves 410 are matched with the adjusting base 150 to adjust folding angles of the first folding part 141 and the second folding part 142 of the folding component 100, thereby realizing folding operations of the outdoor foldable chair 600 shown in FIG. 6.

In another embodiment, the article of outdoor foldable furniture is an outdoor foldable chair and a table, where the frame body 200 is respectively a table leg pipe and a table frame pipe. An end face of the table leg pipe and/or the table frame pipe is provided with an embedded cavity 240 and at least one light bar groove 210 as shown in FIG. 1. The first connecting part 120 and the second connecting part 130 of the foldable component 100 are installed within the embedded cavity 240.

Through the above-disclosed optimized design, the present invention is suitable for matched light installation in foldable furniture, and improves the aesthetic appearance and use effects of outdoor furniture. Moreover, the take-up device 320 that is connected to the controller 300 facilitates release and taking up of the flexible wires 310, to reduce interference by the foldable structures of the present invention to the flexible wires 310.

The above is only an embodiment of the present invention and does not limit the present invention in any form. Any revisions, equivalent changes, or modifications made to the above embodiments according to the technical principle of the present invention, belong to the scope of the technical scheme of the present invention.

We claim:

1. An article of outdoor foldable furniture with a lamplight decoration structure comprising:
   a frame body, wherein the frame body is provided with at least one light bar groove; and
   a foldable component for connecting the frame body, wherein the foldable component comprises a first connecting part, a folding part, and a second connecting part, wherein the first connecting part and the second connecting part are configured to be closed and extended through the folding part, wherein the first connecting part and the second connecting part are both configured to connect to the frame body, wherein one or both of the first connecting part and the second connecting part are provided with a luminous body mounting groove, wherein the luminous body mounting groove is correspondingly disposed in the at least one light bar groove of the frame body.

2. The article of outdoor foldable furniture with the lamplight decoration structure according to claim 1, wherein a lampshade is mounted in the at least one light bar groove of the frame body, wherein a light guide bar is provided in the lampshade, wherein the light guide bar comprises an end face, wherein a light-emitting unit is mounted in the luminous body mounting groove, and wherein the end face of the light guide bar corresponds to the light-emitting unit.

3. The article of outdoor foldable furniture with the lamplight decoration structure according to claim 2, further comprising a controller conductively connected to the light-emitting unit through flexible wires.

4. The article of outdoor foldable furniture with the lamplight decoration structure according to claim 3, wherein the controller is provided with a take-up device, and wherein the flexible wires are configured to be released and taken up through the take-up device.

5. The article of outdoor foldable furniture with the lamplight decoration structure according to claim 1, wherein the at least one light bar groove is provided on one of a side edge and a side wall surface of the frame body.

6. The article of outdoor foldable furniture with the lamplight decoration structure according to claim 1, wherein the article of outdoor foldable furniture is an outdoor foldable chair, and the frame body is a chair leg pipe, wherein the chair leg pipe comprises an end face, wherein the end face of the chair leg pipe is provided with an embedded cavity and the at least one light bar groove, and wherein the first connecting part and the second connecting part of the foldable component are installed within the embedded cavity.

7. The article of outdoor foldable furniture with the lamplight decoration structure according to claim 1, wherein the folding part of the foldable component comprises a first folding part and a second folding part, wherein the first folding part is installed in the first connecting part of the foldable component, and the second folding part is installed in the second connecting part of the foldable component, wherein the first folding part and the second folding part are butted and connected to each other, and wherein a hinge assembly is disposed between the first folding part and the second folding part.

8. The article of outdoor foldable furniture with the lamplight decoration structure according to claim 7, wherein the hinge assembly comprises a first end cover piece and a second end cover piece, wherein the first end cover piece comprises a first end cover and a first shaft disposed on the first end cover, and wherein the second end cover piece comprises a second end cover and a second shaft disposed on the second end cover, and wherein the first shaft and the second shaft are butted and connected to each other.

9. The article of outdoor foldable furniture with the lamplight decoration structure according to claim 7, wherein one of the first folding part and the second folding part is provided with an adjusting base, wherein an upper part of the adjusting base is configured to connect to an armrest piece of the article of outdoor foldable furniture, wherein a bottom surface of the armrest piece is provided with a plurality of adjusting limit grooves.

10. The article of outdoor foldable furniture with the lamplight decoration structure according to claim 1, wherein the article of outdoor foldable furniture is an outdoor foldable chair and a table, wherein the frame body is one or more of a table leg pipe and a table frame pipe, wherein the table leg pipes and the table frame pipes comprise an end face, wherein the end face of the table leg pipes and the table frame pipe pipes is provided with an embedded cavity and the at least one light bar groove, and wherein the first connecting part and the second connecting part of the foldable component are installed within the embedded cavity.

* * * * *